US011734676B2

(12) United States Patent
Rule et al.

(10) Patent No.: US 11,734,676 B2
(45) Date of Patent: **\*Aug. 22, 2023**

(54) USING A CONTACTLESS CARD TO SECURELY SHARE PERSONAL DATA STORED IN A BLOCKCHAIN

(71) Applicant: Capital One Services, LLC, McLean, VA (US)

(72) Inventors: Jeffrey Rule, Chevy Chase, MD (US); Rajko Ilincic, Annandale, VA (US); Kaitlin Newman, Washington, DC (US)

(73) Assignee: Capital One Services, LLC

( * ) Notice: Subject to any disclaimer, the term of this patent is extended or adjusted under 35 U.S.C. 154(b) by 714 days.

This patent is subject to a terminal disclaimer.

(21) Appl. No.: 16/684,323

(22) Filed: Nov. 14, 2019

(65) Prior Publication Data

US 2020/0302432 A1 Sep. 24, 2020

Related U.S. Application Data

(63) Continuation of application No. 16/359,980, filed on Mar. 20, 2019, now Pat. No. 10,535,062.

(51) Int. Cl.
*G06Q 20/36* (2012.01)
*G06Q 20/38* (2012.01)
(Continued)

(52) U.S. Cl.
CPC ....... *G06Q 20/3674* (2013.01); *G06Q 20/352* (2013.01); *G06Q 20/389* (2013.01);
(Continued)

(58) Field of Classification Search
CPC ............. G06Q 20/3674; G06Q 20/352; G06Q 20/3825; G06Q 20/389; G06Q 20/4014
See application file for complete search history.

(56) References Cited

U.S. PATENT DOCUMENTS 5,557,678 A * 9/1996 Ganesan ............. H04L 63/0823
380/282
7,210,037 B2 * 4/2007 Samar ................. G06F 21/6218
380/30
(Continued)

FOREIGN PATENT DOCUMENTS

CA        2702080 A1    4/2009
WO    2018096559 A1    5/2018

OTHER PUBLICATIONS

R. Soltani, U. Trang Nguyen and A. An, "A New Approach to Client Onboarding Using Self-Sovereign Identity and Distributed Ledger," 2018 IEEE International Conference on Internet of Things (iThings) and IEEE Green Computing and Communications (GreenCom) and IEEE Cyber, Physical and Social Computing (CPSCom) and IEE.*
(Continued)

*Primary Examiner* — Steven S Kim
(74) *Attorney, Agent, or Firm* — KDW Firm PLLC

(57) ABSTRACT

Systems, methods, and articles of manufacture to securely share data stored in a blockchain. A contactless card may receive a request to provide a data element from a device. An applet of the contactless card may encrypt the data element and a wallet address. The applet may generate a signature for the request, and transmit, to a mobile device, the signature and the encrypted data. The mobile device may transmit, to a verification service, the signature and encrypted data. The verification service may verify the signature based on a public key. A node in a blockchain may generate a block in the blockchain, the block comprising indications of the verification of the signature, the requested data element, and the wallet address. An encrypted data element corresponding to the data element may be decrypted using a public key. The device may receive the decrypted data element from the wallet address.

20 Claims, 10 Drawing Sheets

(51) Int. Cl.
*G06Q 20/40* (2012.01)
*H04L 9/32* (2006.01)
*H04L 9/06* (2006.01)
*G06Q 20/34* (2012.01)

(52) U.S. Cl.
CPC ..... *G06Q 20/3825* (2013.01); *G06Q 20/4014* (2013.01); *H04L 9/0637* (2013.01); *H04L 9/3247* (2013.01); *H04L 2209/56* (2013.01)

(56) References Cited

U.S. PATENT DOCUMENTS

| | | | | |
|---|---|---|---|---|
| 9,722,790 | B2* | 8/2017 | Ebrahimi | G06Q 20/3276 |
| 10,277,398 | B2* | 4/2019 | Weimer | H04L 9/3213 |
| 10,541,818 | B2* | 1/2020 | Butler | H04W 12/065 |
| 10,692,085 | B2* | 6/2020 | Zagarese | G06Q 20/40145 |
| 10,749,865 | B2* | 8/2020 | Andrade | H04L 63/0861 |
| 11,004,072 | B2* | 5/2021 | Georgiadis | H04L 63/08 |
| 11,206,133 | B2* | 12/2021 | Ebrahimi | H04L 9/3236 |
| 11,488,161 | B2* | 11/2022 | Soundararajan | G06Q 20/06 |
| 2017/0353311 | A1* | 12/2017 | Schukai | H04L 9/3231 |
| 2018/0083771 | A1* | 3/2018 | Bonnell | H04L 9/32 |
| 2018/0144153 | A1* | 5/2018 | Pead | H04L 9/3236 |
| 2018/0308098 | A1 | 10/2018 | Ebrahimi | |
| 2018/0351949 | A1* | 12/2018 | Scott | G06F 21/6218 |
| 2019/0005470 | A1* | 1/2019 | Uhr | H04L 9/3239 |
| 2019/0147431 | A1* | 5/2019 | Galebach | H04L 9/50 705/44 |
| 2021/0058786 | A1* | 2/2021 | Yang | H04L 9/3263 |
| 2021/0073913 | A1* | 3/2021 | Ingargiola | G06Q 20/02 |

OTHER PUBLICATIONS

A. Othman and J. Callahan, "The Horcrux Protocol: A Method for Decentralized Biometric-based Self-sovereign Identity," 2018 International Joint Conference on Neural Networks (IJCNN), 2018, pp. 1-7.*

M. Takemiya and B. Vanieiev, "Sora Identity: Secure, Digital Identity on the Blockchain," 2018 IEEE 42nd Annual Computer Software and Applications Conference (COMPSAC), 2018, pp. 582-587.* https://www.cloudflare.com/learning/ssl/how-does-public-key-encryption-work/.*

D. A. Belurgikar, J. Kanak Kshirsagar, K. K. Dhananjaya and N. Vineeth, "Identity Solutions for Verification using Blockchain Technology," 2019 1st International Conference on Advanced Technologies in Intelligent Control, Environment, Computing & Communication Engineering (ICATIECE), Bangalore, India, 2019, pp. 12.*

International Search Report and Written Opinion for International Patent Application No. PCT /US2020/023594 dated Jun. 9, 2020, 9 pages.

* cited by examiner

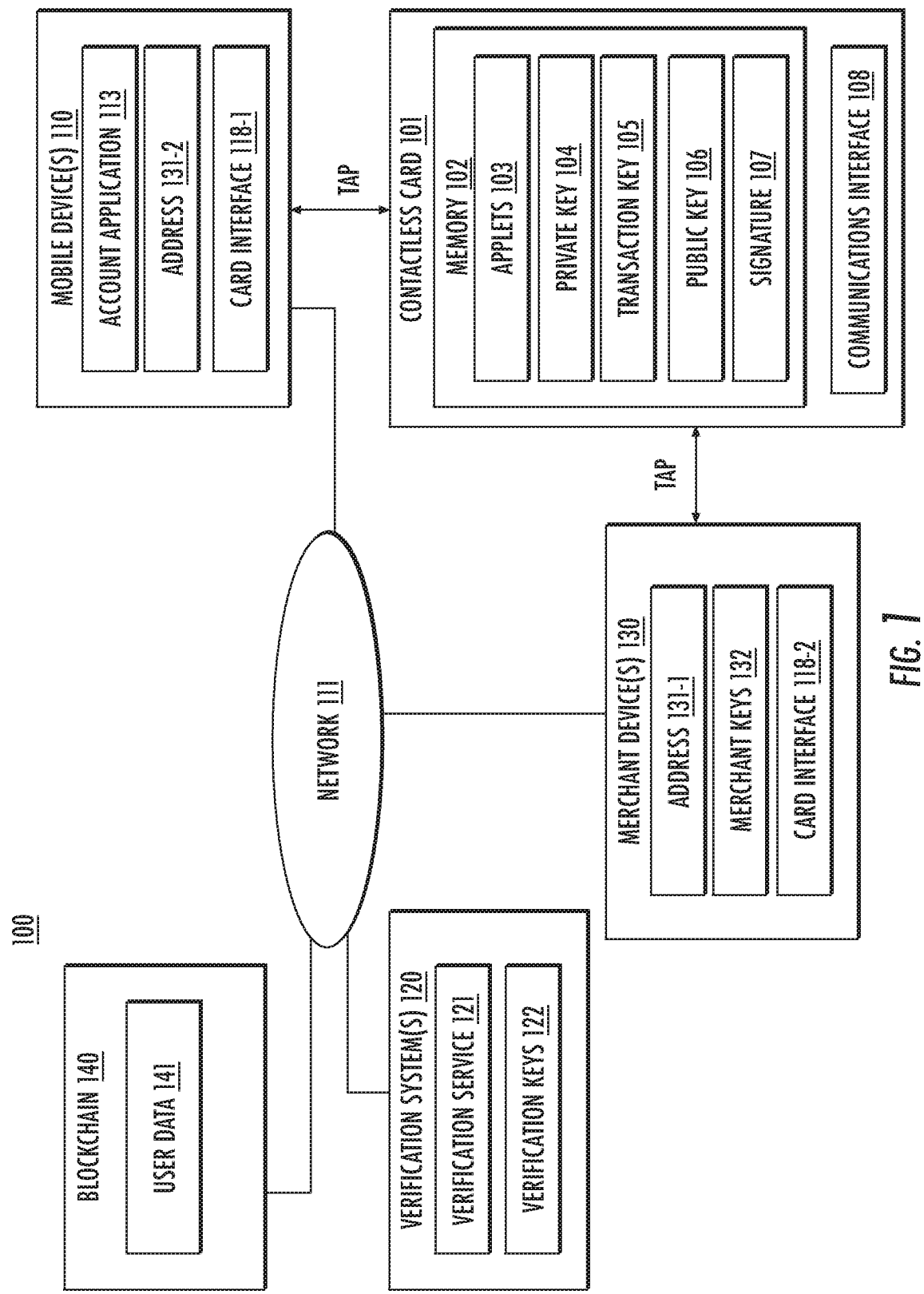

210

MERCHANT DEVICE 130

WALLET: 12AB....12YZ
REQUEST TOKEN: ABC...123
AGE: CUSTOMER IS 38 YEARS OLD. AGE VERIFIED!
HOME ADDRESS: 123 MAIN ST., ANYTOWN, USA

USING A CONTACTLESS CARD TO SECURELY SHARE PERSONAL DATA STORED IN A BLOCKCHAIN

RELATED APPLICATIONS

This application is a divisional of U.S. patent application Ser. No. 16/359,980, entitled "USING A CONTACTLESS CARD TO SECURELY SHARE PERSONAL DATA STORED IN A BLOCKCHAIN" filed on Mar. 20, 2019. The contents of the aforementioned application are incorporated herein by reference.

TECHNICAL FIELD

Embodiments herein generally relate to sharing data, and more specifically, to using a contactless card to securely share personal data stored in a blockchain.

BACKGROUND

Users often need to share personal data with merchants, government officials, and other entities. Using conventional techniques, however, often exposes more personal data than is needed. For example, when purchasing age-restricted items, only the age of the person needs to be provided. However, additional data such as the person's name, address, and driver's license number may be exposed when their driver's license is scanned at the point of sale.

SUMMARY

Embodiments disclosed herein provide systems, methods, articles of manufacture, and computer-readable media for using a contactless card to securely share personal data stored in a blockchain. In one example, a communications interface of a contactless card may receive, from a card reader of a merchant device, a request to provide a user data element to a wallet address associated with the merchant. An applet executing in a memory of the contactless card may encrypt, based on a private key stored in a memory of the contactless card, an indication of the user data element and the wallet address. The applet may generate, based on the private key, a digital signature for the request, and transmit, to a card reader of a mobile device by the communications interface of the contactless card, the digital signature and the encrypted indication of the user data element and the wallet address. The mobile device may transmit, to a verification service, the digital signature and the encrypted indication of the user data element and the wallet address. The verification service may verify the digital signature based on a public key associated with the private key of the contactless card. A node in a blockchain may generate a block in the blockchain corresponding to the request responsive to the verifying by the verification service, the block comprising indications of the verification of the digital signature, the requested data element, and the wallet address associated with the merchant. An encrypted data element corresponding to the user data element may be decrypted using a public key. The device of the merchant may receive the decrypted data element from the wallet address associated with the merchant to fulfill the request.

BRIEF DESCRIPTION OF THE DRAWINGS

FIG. 1 illustrates an embodiment of a system.
FIGS. 2A-2C illustrate examples of using a contactless card to securely share personal data stored in a blockchain.

DETAILED DESCRIPTION

Figure 2A:
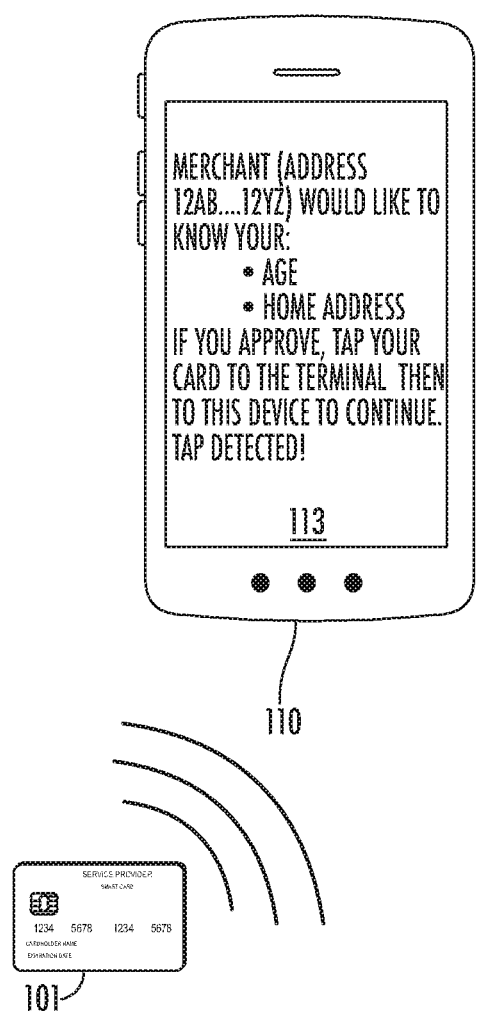

Embodiments disclosed herein provide techniques for securely exposing personal data stored in a blockchain using contactless cards. Generally, a merchant device may store data describing one or more elements of personal data requested from a user. For example, the merchant device may request that the user provide their name and date of birth. In response, the user may tap a contactless card to the merchant device, and receive the data describing the requested elements of user data (e.g., the name and date of birth). An applet executing on the contactless card may generate an encrypted payload using a private key and sign the encrypted payload using the private key. The encrypted payload may generally instruct to expose and/or verify the requested data to a wallet address associated with the merchant. The applet may then transmit the signed encrypted payload to a mobile device of the user. The mobile device of the user may then transmit the received data to a verification service via a network (e.g., the Internet). The verification service may store a corresponding instance of the private key and decrypt the encrypted data using the stored private key. The verification service may further validate the digital signature received from the mobile device. A block may be added to a blockchain to reflect the requested transaction (e.g., the exposure of the name and date of birth). The merchant device may then receive the data from the blockchain and decrypt the data using a corresponding key, thereby exposing the requested data to the merchant device without exposing any additional data of the user.

Advantageously, embodiments disclosed herein leverage contactless cards to expose and/or verify personal information stored in the blockchain. Rather than exposing all personal information, embodiments disclosed herein provide fast, efficient, and secure techniques to expose and/or verify one or more specific data elements on an as-needed basis. Doing so improves the security of personal data and allows for more efficient processing of user data by requesting devices.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to the desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes one or more contactless cards 101, one or more mobile devices 110, one or more verification systems 120, one or more merchant devices 130, and one or more blockchains 140. The contactless cards 101 are representative of any type of payment card, such as a credit card, debit card, ATM card, gift card, and the like. The contactless cards 101 may comprise one or more chips for a communications interface 108, such as a radio frequency identification (RFID) chip, configured to communicate with the mobile devices 110 via near-field communications (NFC), the EMV standard, or other short-range protocols in wireless communication. Although NFC is used as an example communications interface, the disclosure is equally applicable to other types of wireless communications, such as the EMV standard, Bluetooth, and/or Wi-Fi. The mobile devices 110 are representative of any type of network-enabled computing device, such as smartphones, tablet computers, wearable devices, laptops, portable gaming devices, and the like.

The merchant devices 130 are representative of any type of device configured to communicate with a payment card, such as a payment terminal, card reader, mobile device, computing device, and the like. The merchant devices 130 are associated with a wallet address 131-1 of the merchant and one or more cryptographic merchant keys 132. Generally, the merchant devices 130 may communicate with the contactless cards 101 via the card interface 118-2. Similarly, the mobile devices 110 communicate with the contactless cards 101 via a card interface 118-1. The card interfaces 118 (including card interfaces 118-1 and 118-2) may be any type of communications interface, such as a wireless communications interface (e.g., NFC, Bluetooth, and/or RFID), a magnetic stripe reader, and/or a slot configured to communicate data from the memory 102 of the contactless card 101.

As shown, a memory 102 of the contactless card includes one or more applets 103, a private key 104, a transaction key 105, a public key 106, and a digital signature 107. The applets 103 may execute on a processor (not pictured) of the contactless card 101 and are representative of executable code configured to perform any number and type of operations. For example, the applets 103 may include a first applet 103 (referred to herein as a "selection applet") that selects one of the other applets 103 based on the type of function being performed by the contactless card 101. For example, when processing a transaction request, the selection applet 103 may select a second applet 103 (referred to herein as a "transaction applet") that processes transactions using the contactless card 101. In such an embodiment, the transaction applet 103 may select the transaction key 105 to generate cryptographic data to process the transaction. The transaction may be posted to a first instance of the blockchain 140 that is a blockchain for transactions. As another example, when processing a request to provide user data 141 stored in the blockchain 140, the selection applet 103 may select a third applet 103 (referred to herein as a "user data applet") that processes the request to provide user data 141. In such an embodiment, the user data applet 103 may select the private key 104 to process the request to provide user data 141. Such transaction may be posted to a second instance of the blockchain 140 that is a blockchain for storing the user data 141.

In some embodiments, the contactless card 101 may include a single private key (e.g., one of the private key 104 and/or the transaction key 105) which is used to generate cryptographic data for transactions and user data requests. In some such embodiments, the contactless card 101 may include a single applet 103 which generates cryptographic data for transactions and user data requests using the single private key. The particular number and/or type of applets and/or cryptographic keys used herein should not be considered limiting of the disclosure.

For example, a user associated with a contactless card 101 may attempt to purchase an age-restricted item from a merchant. The merchant device 130 of the merchant may require confirmation of the user's age prior to allowing the user to purchase the item. The user may tap the contactless card 101 to the merchant device 130, thereby bringing the contactless card 101 sufficiently close to the card interface 118-2 of the merchant device 130 to enable NFC data transfer between the communications interface 108 of the contactless card 101 and the card interface 118-2 of the merchant device 130. In other embodiments, the user may insert the contactless card 101 in the card interface 118-2 of the merchant device 130. The merchant device 130 may transmit request data including at least the merchant wallet address 131-1, a request token (not pictured) that identifies the request, and an indication of one or more requested elements of user data 141 (e.g., at least the customer's age). The elements of user data may be the user data 141 stored in the blockchain 140. In some embodiments, the user data 141 is stored in a cloud-based database. However, the disclosure is applicable to any type of data storage technique.

In some embodiments, the merchant device 130 may initiate a request to receive user data 141 and/or verify user data. In other embodiments, the mobile device 110 initiates a transaction to provide and/or verify user data 141. The particular entity initiating communication should not be considered limiting of the disclosure, as any entity in the system 100 may initiate a given request to receive user data 141 and/or transaction to provide user data 141.

In response to receiving an exposure and/or verification request from the merchant device 130, the selection applet 103 may determine that the type of the request is associated with a request to provide user data 141. Therefore, the selection applet 103 may select the user data applet 103 and provide the received data to the user data applet 103. The user data applet 103 may then select the private key 104 to generate encrypted data used to verify the release of the requested user data elements. For example, a cryptographic function of the user data applet 103 may encrypt the merchant wallet address 131-1, request token, and indications of the requested data elements using the private key 104. In some embodiments, additional data elements may be encrypted using the private key 104, such as an account identifier of the contactless card 101, an identifier of the user, etc. Furthermore, the user data applet 103 may generate a digital signature 107 using the private key 104 and a cryptographic function. The digital signature 107 is used to confirm that the user has authorized the release of the requested user data 141 from the blockchain 140.

The user data applet 103 may then transmit the encrypted data (including the digital signature 107) to the account application 113 of the mobile device 110 responsive to a tap of the contactless card 101 to the mobile device 110. The user may tap the contactless card 101 to the mobile device 110, thereby bringing the contactless card 101 sufficiently close to the card interface 118-1 of the mobile device 110 to enable NFC data transfer between the communications interface 108 of the contactless card 101 and the card interface 118-1 of the mobile device 110. Generally, the account application 113 allows users to perform various account-related operations, such as viewing account balances, processing payments, and exposing user data 141. In some embodiments, a user must authenticate using authentication credentials to access the account application 113. For example, the authentication credentials may include a username and password, biometric identifiers (e.g., a fingerprint, iris scan, etc.), and the like. The mobile device 110 is generally under the control of an operating system (not pictured). Example operating systems include the Android® OS, iOS®, macOS®, Linux®, and Windows® operating systems.

The account application 113 may then transmit a wallet address 131-2 associated with the user and the data received from the contactless card 101 to the verification service 121 of one or more verification systems 120. The verification service 121 may then verify the digital signature 107 using a key from the verification keys 122 and a signature verification algorithm. The verification keys 122 may include copies of the private key 104 and the public key 106 of the contactless card 101. The verification service 121 may decrypt the digital signature 107 using the verification key 122 (e.g., the public key 106) and the signature verification algorithm to verify the digital signature 107. Furthermore, the verification service 121 may decrypt the encrypted data generated by the contactless card 101 using one of the verification keys 122 (e.g., a copy of the private key 104 of the contactless card 101). In some embodiments, the verification service 121 may determine whether the decrypted data includes an expected value (e.g., the customer identifier, account identifier, etc.) before exposing the requested data. Therefore, for example, if the verification service 121 is not able to verify the digital signature 107 and/or decrypt the encrypted data, the verification service 121 may refrain from exposing the requested data.

Once the digital signature 107 is verified and/or the encrypted data generated by the contactless card 101 is decrypted, the verification service 121 may cause a compute node to generate a block in the blockchain 140 reflecting the requested exposure of user data 141. For example, the block in the blockchain 140 may include an encrypted indication of the wallet address 131-2 of the user (or other user and/or account identifier), the merchant wallet address 131-1, the request token, the public key 106, and the relevant user data 141 (e.g., the age of the user in the previous example). Once posted to the blockchain 140, the merchant device 130 may decrypt the data in the blockchain 140 (e.g., using a key 132 and/or the public key 106) to read the user data 141. Therefore, continuing the with the previous example, the merchant device 130 may decrypt the data in the blockchain 140 to read the request token and the age of the user. In some embodiments, the merchant device 130 may validate the digital signature 107 using the public key 106. The merchant device 130 may then determine the age of the user. If the determined age is above the age restriction for the product, the merchant device 130 may permit the user to purchase the product. Otherwise, the merchant device 130 may restrict the user from purchasing the product.

According to some embodiments, the merchant device 130 may receive verification without receiving the actual user data 141. Instead, in such embodiments, logic external to the merchant device 130 (e.g., the verification service 121) may receive the user data 141, process the user data 141, and transmit a result to the merchant device 130. For example, the verification service 120 may determine whether the age of the user is above the age restriction for the product. The verification service 121 may then transmit a result (e.g. yes, the customer is of age and/or no, the customer is not of age) to the merchant device 130, which may restrict and/or permit the purchase based on the received result without having the user's actual age being exposed to the merchant device 130.

Furthermore, the verification service 121 may be configured to manage and verify the user data 141 stored in the blockchain 140. For example, a user may submit documents reflecting an updated home address. The submitted documents may be verified (e.g., by the verification service 121 using one or more image analysis and/or NLP algorithms or a user). Once verified, the verification service 121 may generate a signature (e.g., a hash value) for the documents and/or updated home address using a verification key 122 associated with the verification service 121 (and/or an entity providing the verification service 121). The user data 141 for the user may then be updated to reflect the new home address of the user (which may include the documents submitted by the user as metadata). The digital signature generated by the verification service 121 may be verified by a recipient (e.g., the merchant device 130, the verification service 121, etc.) of the user data 141 using a corresponding public key to verify the authenticity of the user data 141. Therefore, in some embodiments, a merchant device 130 may request verification of user data 141 and receive verification of the user data 141 without the actual user data 141 being exposed to the merchant device 130.

Furthermore, as blocks are added to the blockchain 140 for requests to expose and/or verify user data 141, these blocks may be used to process subsequent requests to expose and/or verify user data 141. For example, the verification service 121 may determine, based on the blocks in the blockchain 140, that the user has previously exposed and/or verified their driver's license number with a given merchant. Therefore, the verification service 121 may determine that the merchant is trusted by the user and permit subsequent exposure and/or verification of the driver's license to the merchant. If, however, no prior blocks in the blockchain 140 reflect exposure of data to the merchant, the verification service 121 may decline a request to expose and/or verify user data 141 to protect the user data 141. In some embodiments, the verification service 121 may allow the user and/or the merchant to receive verification of the drivers license number without having to re-expose the driver's license number based on the previous verification and/or exposure.

The user data 141 may include any type of personally identifiable data. Example elements of user data 141 include, without limitation, a user's name, an image of their face, a home address, email address, national identification number (e.g., social security number), passport number, vehicle registration, license plate number, driver's license number, fingerprints, handwriting, credit card numbers, digital identity, date of birth, birthplace, genetic information, telephone numbers, login names, screen names, nicknames, and passwords. Therefore, any request to expose and/or verify user data 141 generated by the merchant devices 130 may include any number and type of elements of user data 141. For example, the merchant device 130 may request the email address, age, and an image of the user's face. Advantageously, using the techniques described herein, only the email address, age, and image of the user's face are exposed to the requesting merchant device 130, thereby preserving the security and privacy of the other elements of user data 141 of the user.

Similarly, if verification of one or more elements of user data 141 is requested, the verification service 121 may verify those elements of user data 141 without exposing the actual user data 141 to the merchant device 130. For example, a merchant device 130 may request verification that a user resides in a particular state, the verification service 121 may decrypt the user data 141 and determine whether the user's residence address is located within the state. In response, the verification service 121 may transmit a result of the verification (e.g., whether the user resides in the state) without exposing the user's address. More generally, the merchant device 130 may request verification that the user data 141 meets one or more criteria (e.g., age criteria, address criteria, etc.). The verification service 121 may then decrypt the user data 141 and compare the decrypted user data 141 to the criteria. For example, if the request specifies to validate that the user is 18 years or older, the verification service 121 may decrypt the user data to determine the user's age and compare the user's age to the criterion (e.g., is the user's age >18 years old). The verification service 121 may then transmit a result of the comparison to the merchant device 130.

The contactless card 101 may be configured to perform key diversification techniques to generate the cryptographic data and/or digital signatures described herein. Examples of key diversification techniques are described in U.S. patent application Ser. No. 16/205,119, filed Nov. 29, 2018. The aforementioned patent application is incorporated by reference herein in its entirety.

Network 111 may be configured to provide communications between the client devices, merchant devices 130, verification systems 120, and blockchain 140. For example, network 111 may be any type of network (including infrastructure) that provides communications, exchanges information, and/or facilitates the exchange of information, such as the Internet, a Local Area Network, or other suitable connection(s) that enables system 100 to send and receive information between the components of system 100.

FIG. 2A is a schematic 200 depicting the mobile device 110 executing the account application 113. Generally, the account application 113 of the mobile device 110 may communicate with the merchant device 130 to receive data from the merchant device 130 describing the requested user data 141. The account application 113 may then output a graphical user interface (GUI) specifying the data requested by the merchant device 130. As shown, for example, the merchant device 130 has requested the age and home address of the user. In other embodiments, however, the merchant device 130 may request verification of the user's age and home address (e.g., whether the age exceeds an age threshold and/or whether the home address meets one or more criteria). The account application 113 outputs instructions to the user specifying to tap the contactless card 101 to the merchant device 130 and the mobile device 110 to approve the release of the home address and age.

As stated, once tapped to the merchant device 130, the contactless card 101 receives data from the merchant device 130 including the request token, merchant wallet address 131-1, and requested data elements (e.g., home address and age). In some embodiments, the merchant device 130 may specify the criteria (e.g., the age threshold, location criteria, etc.) The selection applet 103 of the contactless card 101 may then determine, based on analysis of the received data, that the received data is associated with the user data 141. The selection applet 103 may then select the user data applet 103, which generates encrypted data and the digital signature 107 using the private key 104.

The user data applet 103 may then transmit the encrypted data, data received from the merchant device 130, and the digital signature 107 to the mobile device 110 (e.g., via NFC). The account application 113 may then transmit the received data and the user wallet address 131-2 to the verification service 121. In some embodiments, the user wallet address 131-2 is stored in the memory of the contactless car 101 and provided to the mobile device 110 by the applet 103. The verification service 121 may then validate the digital signature 107 using the public key 106 associated with the contactless card 101 and decrypt the encrypted data using the private key 104 of the contactless card 101. The verification service 121 may then select the requested elements of user data 141 (e.g., the age and home address) and generate a block in the blockchain 140 for the requested data. The user data 141 in the generated block may be encrypted to safeguard the user data 141. In some embodiments, the verification service 121 does not store the requested user data 141 in the block in the blockchain 140. For example, if the request specifies to verify that the user was born in 1980, the verification service 121 may decrypt the user's birthdate and determine whether the user's birth year was in 1980. In such an example, the verification service 121 may store, in the block of the blockchain, an indication of whether the user was born in 1980.

FIG. 2B is a schematic 210 depicting a display 211 of the merchant device 130 outputting a result of the exposure of the user's age and home address. As shown, the merchant device 130 determines that the age of the user has been verified (e.g., if the user attempts to purchase an age-restricted item, enter an age-restricted establishment, etc.). Advantageously, however, only the requested elements of user data 141 are exposed, and the remaining user data 141 stored in the blockchain 140 remains secure.

Figure 2C:
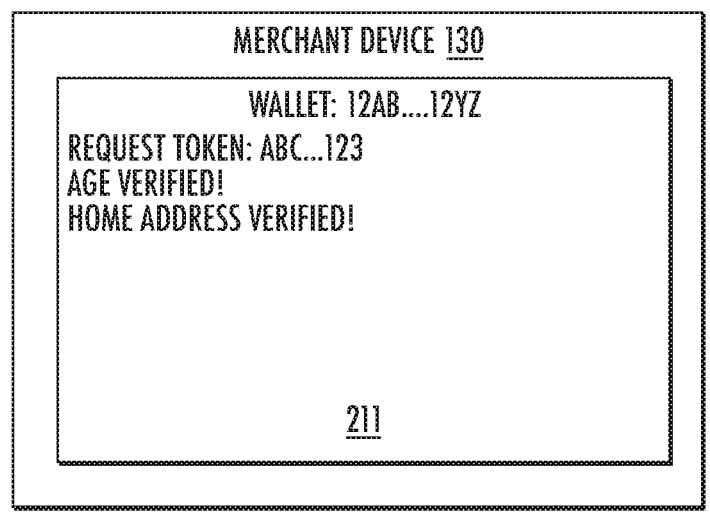

As stated, in some embodiments, the request from a merchant device 130 may specify to verify user data 141 without exposing the actual user data 141. FIG. 2C is a schematic 220 illustrating an embodiment where the merchant device 130 receives verification of the user's age without receiving the user's actual age and verification of the user's home address without receiving the user's home address. For example, if the request in FIG. 2A is to determine whether the user can purchase an age-restricted item and the user lives within one of three different states, the verification service 121 may verify the user's age and residence in the user data 141 based at least in part on the decryption of the encrypted data with the private key 104. For example, the verification service 121 may compare the decrypted user data 141 to one or more criteria and return a result of the comparisons.

As shown, if the decrypted age indicates the user is permitted to purchase the age restricted item (e.g., the user's age is greater than the age criterion), the verification service 121 may transmit an indication of approval to the merchant device 130 without exposing the user's actual age. Similarly, if the decrypted age indicates the user is restricted from purchasing the age restricted item (e.g., the user's age is less than the age criterion), the verification service 121 may transmit an indication specifying that the user does not meet the age requirement without exposing the user's actual age. Furthermore, if the user's address in the decrypted user data 141 indicates the user lives in one of the three states, the verification service 121 transmits an indication specifying that the user lives in one of the three states without exposing the address. As stated, in such embodiments, the verification service 121 may store the results of the comparisons in the blockchain 140 rather than the actual values of user data 141.

Figure 3:
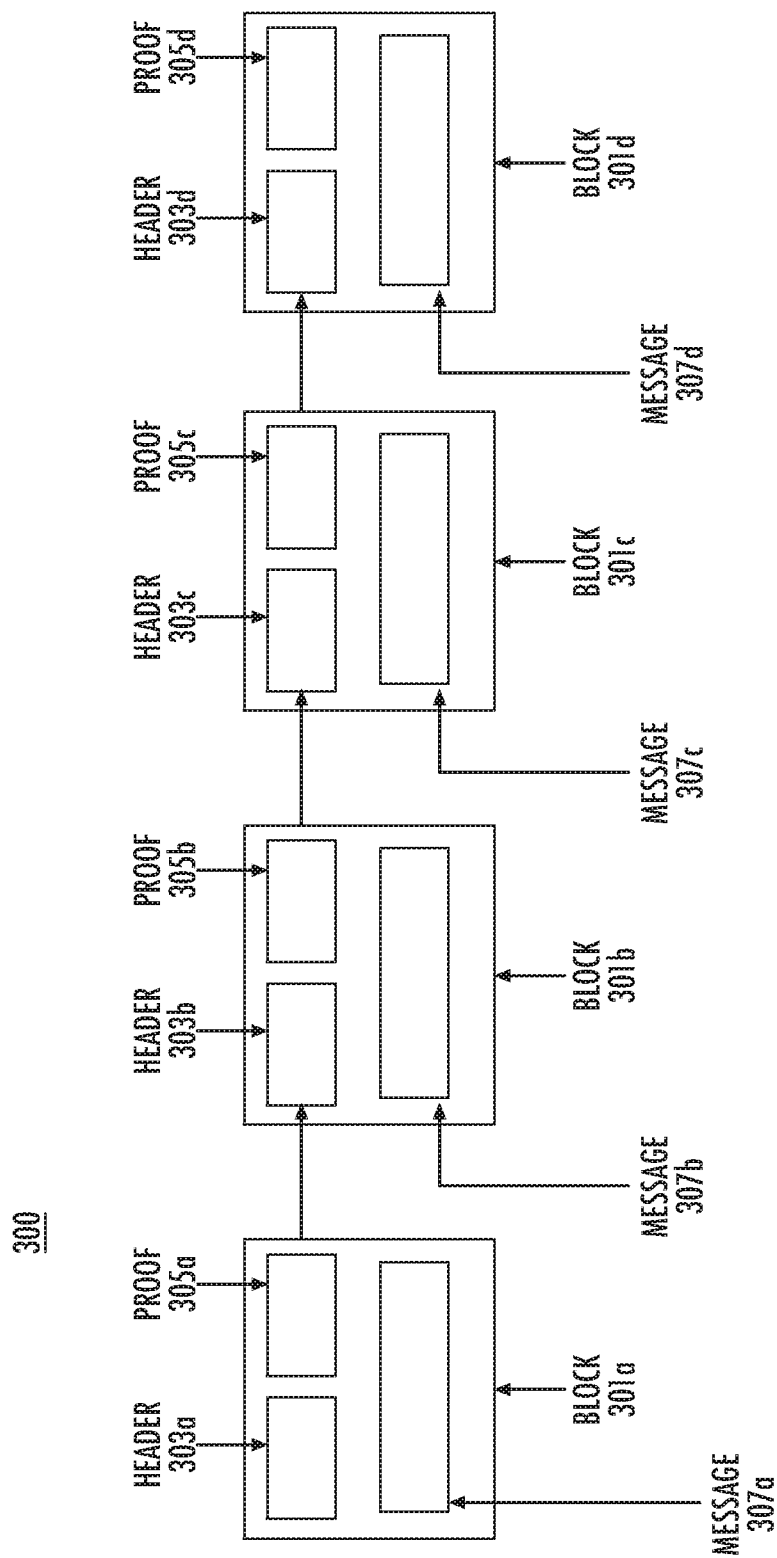
FIG. 3 depicts a logical model of an exemplary blockchain.

FIG. 3 depicts a logical model 300 of an exemplary blockchain 140, consistent with disclosed embodiments. Blockchain 140 may comprise many such blockchains maintained by many different systems. Such exemplary blockchains may comprise blocks, such as blocks 301a-301d. Blocks may include messages, such as messages 307a-307d. Generally, blocks may include a header, such as headers 303a-303d, which uniquely identify each block. The headers 303a-303d may include a hash value generated by a hash function. A hash function is any function that can be used to map input data of arbitrary size to a hash value of a fixed size. For example, a header may include at least one of the previous block's hash value, a hash value generated based on any messages in the block (e.g., a Merkle root), and a timestamp. Consistent with disclosed embodiments, system 100 may require that blocks added to blockchain 140 satisfy at least one of a proof-of-work condition (e.g., a proof 305a-305d) and a digital signature condition. For example, the headers 303a-303d may include a nonce chosen to ensure the header satisfies the proof-of-work condition. As a non-limiting example, the proof-of-work condition may require the hash of the header fall within a predetermined range of values. As an additional example, the header may be digitally signed with a cryptographic key of an authorized system (e.g., the private key 104, the transaction key 105, the verification keys 122, and/or the merchant keys 132), and the digital signature may be included in the header. This digital signature may be verified using a key available to the members of system 100. Generally, one or more designated components of the system 100 (e.g., the blockchain 140, etc.) may generate blocks 301 including headers 303, proofs 305, and messages 307 for user data 141 stored in the blockchain 140.

Figure 4:
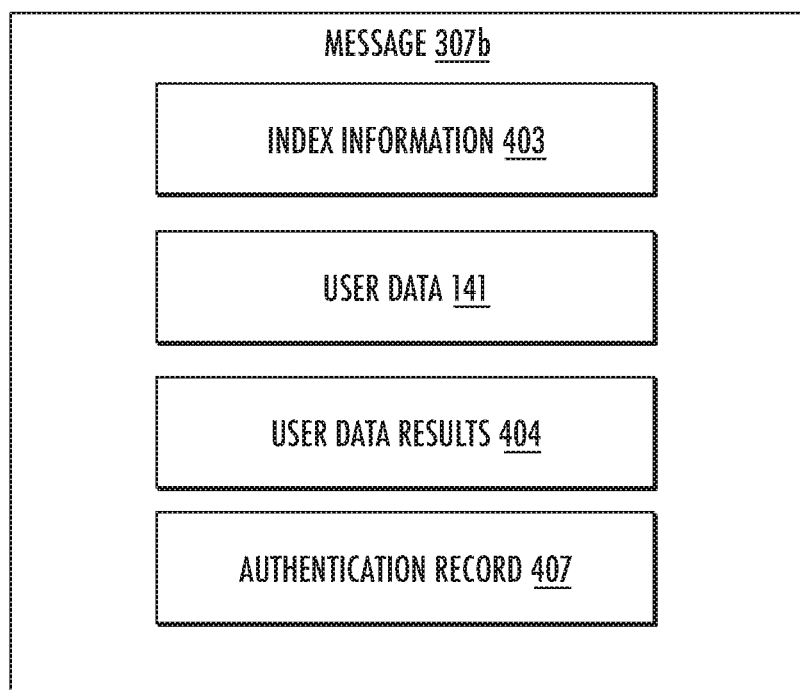
FIG. 4 depicts a logical model of a message stored in a blockchain.

FIG. 4 depicts a logical model of a message 307b stored in the blockchain 140, consistent with disclosed embodiments. In some embodiments, a designated component of the system 100 (e.g., the blockchain 140, etc.) generates blockchain messages such as the message 307b. In some embodiments, message 307b may comprise index information 403. In certain embodiments, index information 403 may comprise information identifying a user. For example, index information 403 may be at least one of a full name, email address, phone number, or other non-sensitive personal information of the user. In certain embodiments, the index information 403 includes one or more elements of user data 141. In various embodiments, index information 403 may include one or more references to earlier blocks in the blockchain 140. For example, index information 403 may include one or more references to one or more earlier blocks associated with the same user. A reference may include, as a non-limiting example, a hash of a preceding block in the blockchain associated with the same user. In some embodiments, index information 403 may be obfuscated or encrypted according to methods known to one of skill in the art. For example, index information 403 may be encrypted with a cryptographic key. As an additional example, index information 403 may comprise a hash of the at least one of a full name, email address, phone number, or other non-sensitive personal information of the user.

Message 307b may comprise user data 141, consistent with disclosed embodiments. In various embodiments, the user data 141 may be stored as part of the index information 403, and/or stored separate from the index information 403. In some embodiments, user data 141 may be obfuscated or encrypted according to methods known to one of skill in the art. For example, user data 141 may be encrypted with a cryptographic key (e.g., the private key 104 and/or transaction key 105 of the contactless card 101, the merchant keys 132 of the merchant devices 130, and/or the verification keys 122 of the verification system 120). Message 307b may further include the merchant wallet address 131-1, the user wallet address 131-2, and/or the public key 106. In various embodiments, the wallet address 131-1, the user wallet address 131-2, and/or the public key 106 may be stored as part of the index information 403, and/or stored separate from the index information 403.

Message 307b may comprise user data results 404, consistent with disclosed embodiments. Generally, the user data results 404 may include the results of comparisons of user data 141 to one or more criteria by the verification service 121 and/or the blockchain 140. For example, if a merchant device 130 requests verification that a user is at least 21 years old, the user data results 404 reflect whether the user is at least 21 years old. In some embodiments, a message 307b including user data 404 may not include the actual user data 141 (e.g., the user's age). In some embodiments, user data results 404 may be obfuscated or encrypted according to methods known to one of skill in the art. For example, user data results 404 may be encrypted with a cryptographic key (e.g., the private key 104 and/or transaction key 105 of the contactless card 101, the merchant keys 132 of the merchant devices 130, and/or the verification keys 122 of the verification system 120). In various embodiments, the user data results 404 may be stored as part of the index information 403, and/or stored separate from the index information 403.

Message 307b may comprise authentication record 407, consistent with disclosed embodiments. In some embodiments, authentication record 407 may comprise information enabling subsequent auditing of transactions. For example, authentication record 407 may identify at least one of verification system 120, a commercial institution associated with verification system 120, a purpose of the authentication request (e.g., to expose and/or verify elements of user data 141), a result of the authentication request (e.g., which elements of user data 141 were exposed and/or verified), and information related to the authentication request. In some embodiments, a purpose of the authentication request may include the creation of a relationship (e.g., a financial relationship, such as a bank account, brokerage account, credit card account, and/or loan account) with a commercial institution associated with verification system 120, or the performance of a service by verification system 120 (e.g., exposing and/or verifying user data 141 to merchant devices 130, performing transactions in a financial account associated with the user, cashing a check provided by the user, and/or selling a cashier's check to the user). As would be appreciated by one of skill in the art, the above exemplary authentication purposes are not intended to be limiting. In some embodiments, a result of the authentication request may include whether the purpose of the authentication request was achieved. For example, when the purpose of the authentication request was creation of a relationship, the result of the authentication request may indicate whether the relationship was created. As another example, when the purpose of the authentication request was exposing and/or verifying one or more elements of user data 141, the result of the authentication request may indicate whether the elements of user data 141 were exposed and/or verified. As would be appreciated by one of skill in the art, the above exemplary authentication results are not intended to be limiting. In some embodiments, information related to the authentication request may include additional contact information, demographic information, financial information, or similar personal information provided in connection with the authentication request. In some embodiments, such information may merely indicate that such information was provided, and/or provide a location where such information may be obtained. In some embodiments, authentication record 407 may be obfuscated or encrypted according to methods known to one of skill in the art. For example, authentication record 407 may be encrypted with a cryptographic key.

Cryptographic keys may be used to encrypt elements of messages in blocks, consistent with disclosed embodiments. In some embodiments, such cryptographic keys may be associated with members of the system 100 (e.g., verification system 120, contactless cards 101, mobile devices 110, merchant devices 130, etc.). In various embodiments, at least some of the cryptographic keys may be associated with authorized systems. Corresponding cryptographic keys may be available to decrypt the encrypted message elements, consistent with disclosed embodiments. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element. In some embodiments, the corresponding cryptographic keys may be available to members of authentication system (e.g., verification system 120, contactless cards 101, mobile devices 110, merchant devices 130, etc.). As stated, such cryptographic keys may be used to store user data 141 in the blockchain 140, expose and/or verify user data 141 stored in the blockchain 140, and create records reflecting the exposure and/or verification of user data 141 stored in the blockchain 140.

Figure 5:
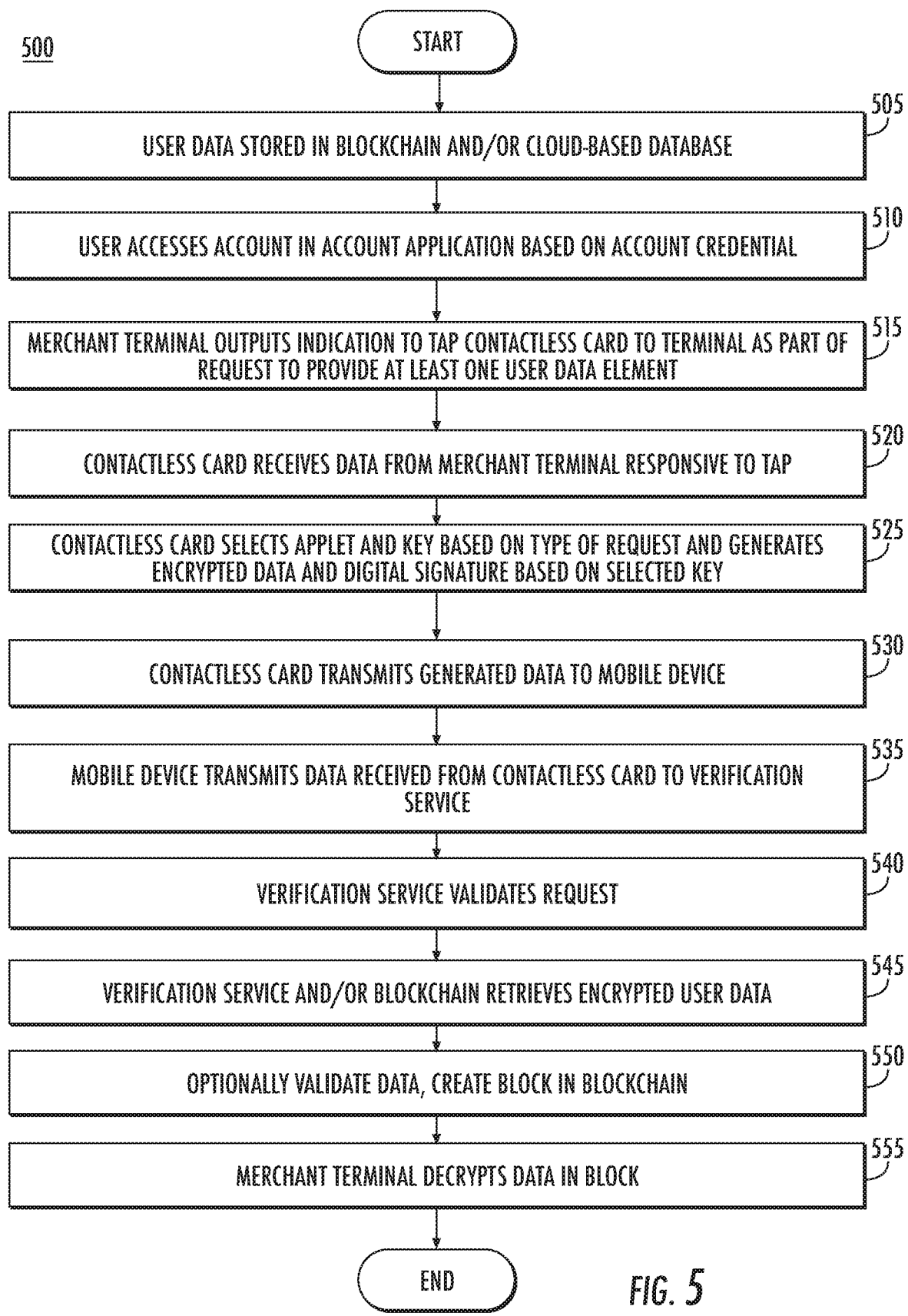
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may be representative of some or all operations to use the contactless cards 101 to securely share user data 141 stored in a blockchain 140. Embodiments are not limited in this context.

As shown, the logic flow 500 begins at block 505, where the user data 141 is stored in the blockchain 140 and/or a cloud-based database. In some embodiments, the cloud-based database storing the user data 141 is a component of the blockchain 140. Generally, the user data 141 may be encrypted and stored in any suitable data storage entity (e.g., a database, files, one or more blocks of the blockchain 140, etc.). One or more elements of user data 141 may be signed by the verification service 121 (e.g., using a private key of the entity associated with the verification service 121 to generate a digital signature). At block 510, a user may access the account application 113 on a mobile device 110 and provide valid authentication credentials (e.g., username/password, fingerprint, etc.). At block 515, the merchant device 130 outputs an indication specifying to tap the contactless card 101 to the merchant device 130 as part of a request to receive one or more elements of user data 141. For example, the merchant device 130 may be associated with a mass transit system and the user's full name, address, date of birth, and identification number may need to be verified to allow the user to travel on the mass transit system. As another example, the request may specify to validate user data 141 according to one or more criteria.

At block 520, the contactless card 101 is tapped to the merchant device 130 and receives data from the merchant device 130. The data may include a request token, the requested data elements (e.g., full name, address, date of birth, identification number), and the wallet address 131-1 of the merchant. At block 525, the selection applet 103 selects the user data applet 103 and private key 104 based on a type of the data received at block 520. For example, by analyzing the data received from the merchant device 130, the applet 103 may determine that user data 141 is requested. The user data applet 103 may then generate encrypted data and a digital signature 107 using the private key 104. At block 530, the contactless card 101 transmits the encrypted data and digital signature 107 to the mobile device 110.

At block 535, the account application 113 of the mobile device 110 transmits the wallet address 131-2 and the data received from the contactless card 101 to the verification service 121. At block 540, the verification service 121 validates the request to verify the user data 141. For example, the verification service 121 may decrypt the digital signature 107 using the public key 106 of the contactless card. Additionally, the verification service 121 may decrypt the encrypted data generated by the contactless card 101 using a copy of the private key 104 stored in a memory of the verification system 120. At block 545, the verification service 121 and/or the blockchain 140 retrieves the requested user data 141 (e.g., full name, address, date of birth, identification number). In some embodiments, the verification service 121 and/or the blockchain 140 may validate the user data according to the one more criteria. For example, the verification service 121 and/or the blockchain 140 may determine whether an age exceeds a threshold, a user lives in one or more locations, etc.

At block 550, a block in the blockchain 140 is generated to reflect the release of the requested user data 141 to the merchant's address 131-1 from the user's wallet address 131-2. As stated, while third parties can view the transaction details, the actual user data 141 remains encrypted in the block of the blockchain 140. As stated, in verification embodiments, the verification service 121 and/or the blockchain 140 may store a result of the comparison of the user data 141 to the criteria (e.g., is the user at least as old as the specified age) as the user data results 404. At block 555, the merchant device 130 reads the block in the blockchain 140 generated at block 550. The merchant device 130 may then decrypt the encrypted data using a merchant key 132 of the merchant. Once decrypted, the data may be analyzed by the merchant device 130 and/or a user. For example, the merchant device 130 may determine that the decrypted user data 141 (e.g., full name, address, date of birth, identification number) matches the corresponding data on the user's mass transit ticket. The user may then be permitted to board the mass transit vehicle. As another example, the block may specify the result of any required comparison. In such an example, the merchant device 130 determines the result of the comparison of the user data to the criteria from the user data results 404 of the blockchain 140.

Figure 6:
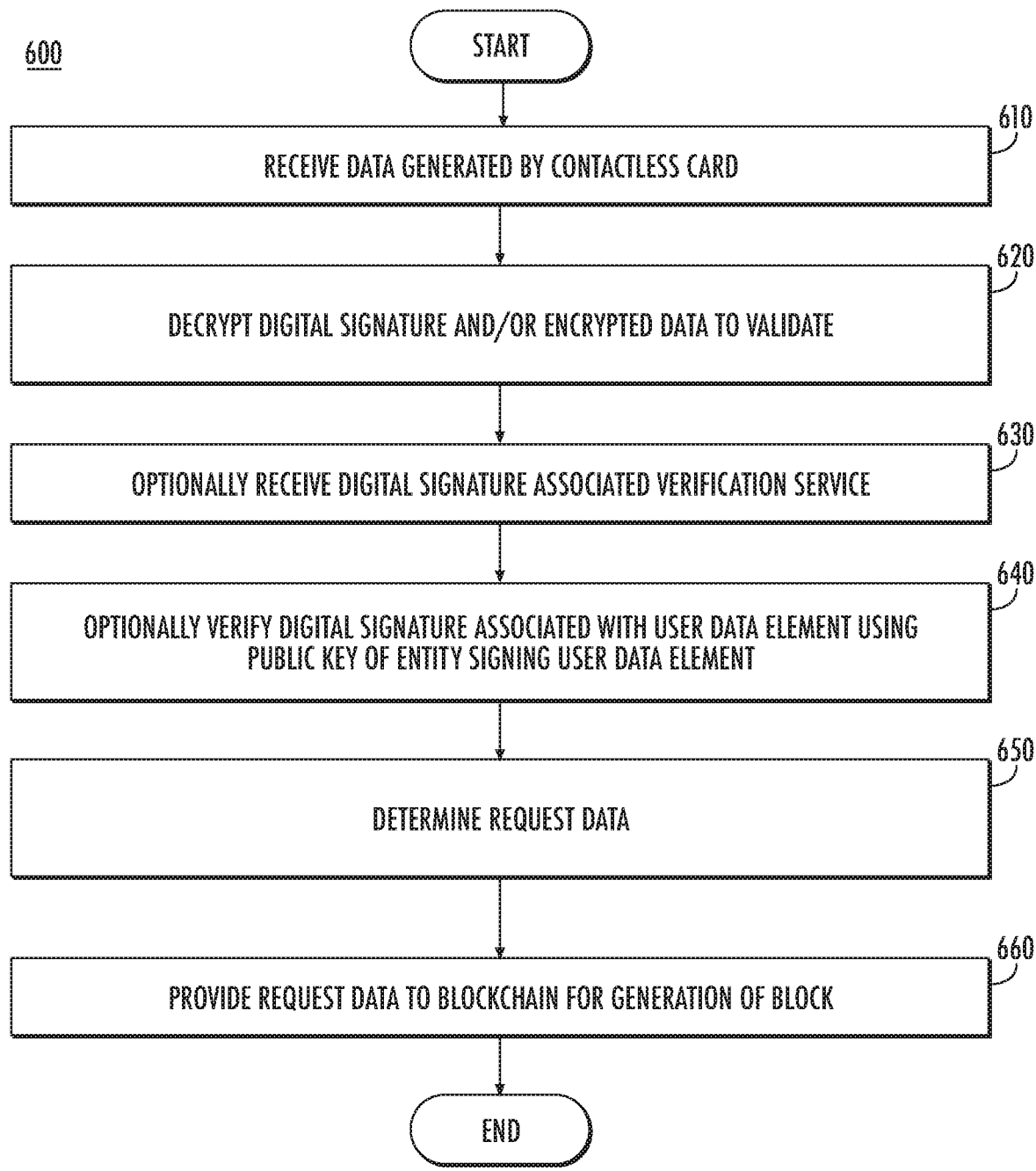
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may include some or all of the operations executed by the verification service 121 to expose user data 141 to a requesting merchant device 130. Embodiments are not limited in this context.

As shown, the logic flow 600 begins at block 610, where the verification service 121 receives the data generated by the contactless card 101 (e.g., the digital signature 107 and encrypted data). At block 620, the verification service 121 decrypts the digital signature 107 using the public key 106 and a signature verification algorithm to verify that the request to expose the user data 141 originated from the contactless card 101. Similarly, the verification service 121 may decrypt the encrypted data using the private key 104 to confirm that the request to expose the user data 141 originated from the contactless card 101.

At block 630, the verification service 121 may receive the digital signature associated with the requested elements of user data 141 stored in the blockchain 140. As stated, an entity providing the verification service 121 may sign each element of user data 141 with a corresponding digital signature to verify the authenticity thereof. At block 640, the verification service 121 may verify the digital signature associated with the requested elements of user data 141 stored in the blockchain 140. For example, the digital signature may be decrypted using the corresponding public key to verify the digital signature, e.g., to validate the requested data before providing the same to the merchant device 130. At block 650, the verification service 121 determines the data associated with the request. For example, the verification service 121 may extract, from the decrypted data generated by the contactless card 101, the request token, the requested elements of user data 141, account and/or user identifier, and the merchant wallet address 131-1. In one embodiment, the verification service 121 may receive the requested elements of user data 141 (e.g., an image of the user's face) from the blockchain 140. In another embodiment, the verification service 121 indicates the requested data element (e.g., a URL, storage location, description, etc.) sufficient to allow a component of the blockchain 140 to receive the requested data element from the user data 141.

At block 660, the verification service 121 provides the request data to the blockchain 140 for generation of a block. The blockchain 140 may generate the block which includes the requested (but encrypted) user data 141. As stated, in some embodiments, the verification service 121 provides the requested user data 141. In other embodiments, the blockchain 140 retrieves the user data 141 based on the information received from the verification service 121 (e.g., by accessing data at the specified URL, selecting a record of data associated with the user from a database, etc.). In some embodiments, the verification service 121 does not provide the user data 141 to the merchant device 130. Instead, the verification service 121 may verify the user data 141 and transmit a result of the verification to the merchant device 130.

Figure 7:
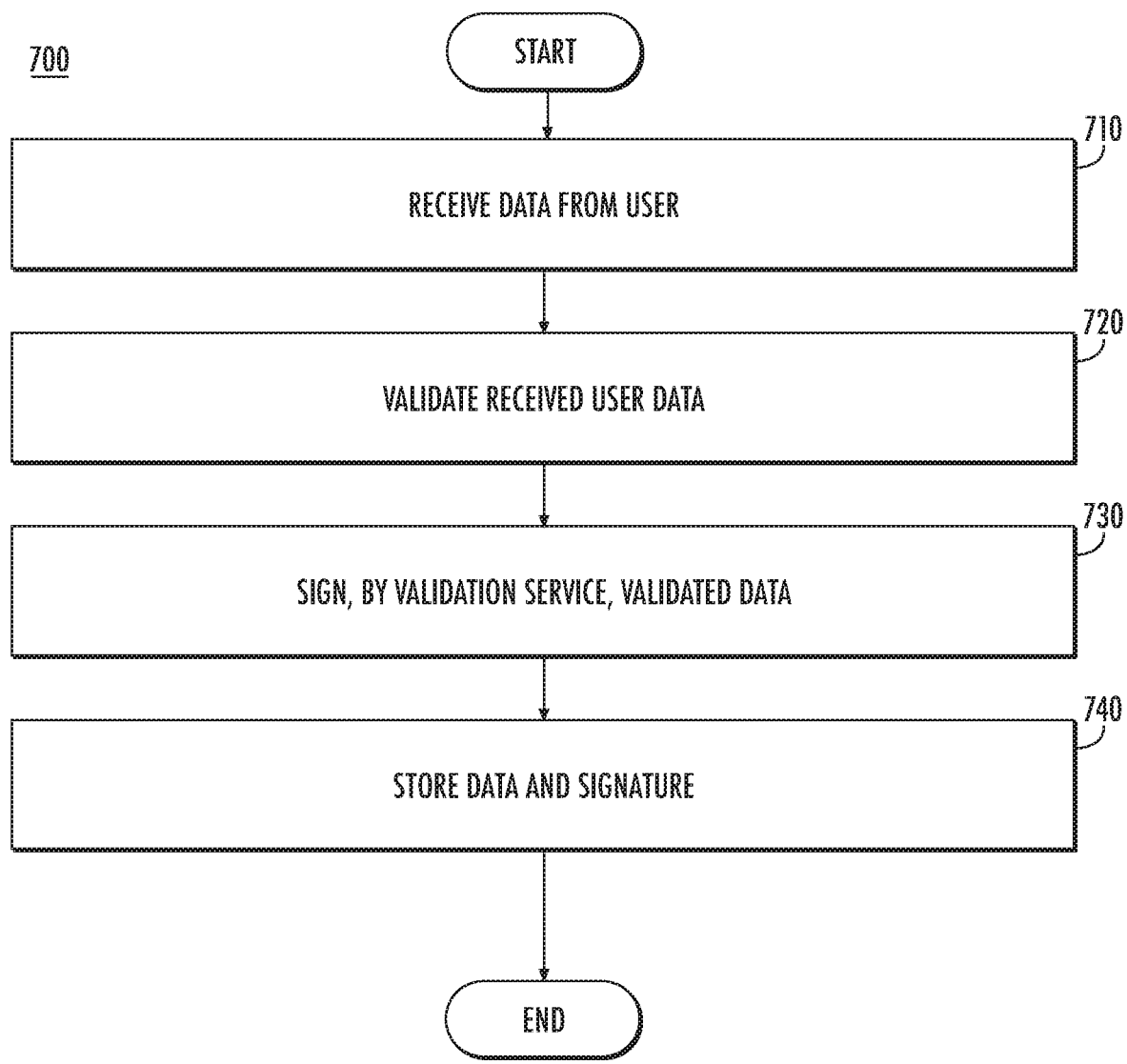
FIG. 7 illustrates an embodiment of a third logic flow.

FIG. 7 illustrates an embodiment of a logic flow 700. The logic flow 700 may be representative of some or all of the operations executed by one or more embodiments described herein. For example, the logic flow 700 may be representative of one or more operations to store user data 141 in the blockchain 140. Embodiments are not limited in this context.

As shown, the logic flow 700 begins at block 710, where user data describing the user is received. The user data may be received from any source, such as the account application 113, a web service, paper forms, and the like. At block 720, the received user data is validated. For example, the verification service 121 may perform image processing on an image of the user to determine whether a face depicted in the image matches other known images of the user. As another example, employees of the entity providing the verification service 121 may verify the user data. At block 730, the verification service 121 generates a digital signature for the validated user data, e.g., using a private key associated with the verification service 121. At block 740, the validated data and the digital signature are stored as user data 141. For example, a database of user data 141 may be updated to reflect the addition of the validated and signed user data. As another example, one or more blocks including the digital signature and encrypted versions of the user data may be added to the blockchain 140. Doing so allows the stored user data 141 to be securely and selectively exposed using the contactless cards 101 as described herein.

Figure 8:
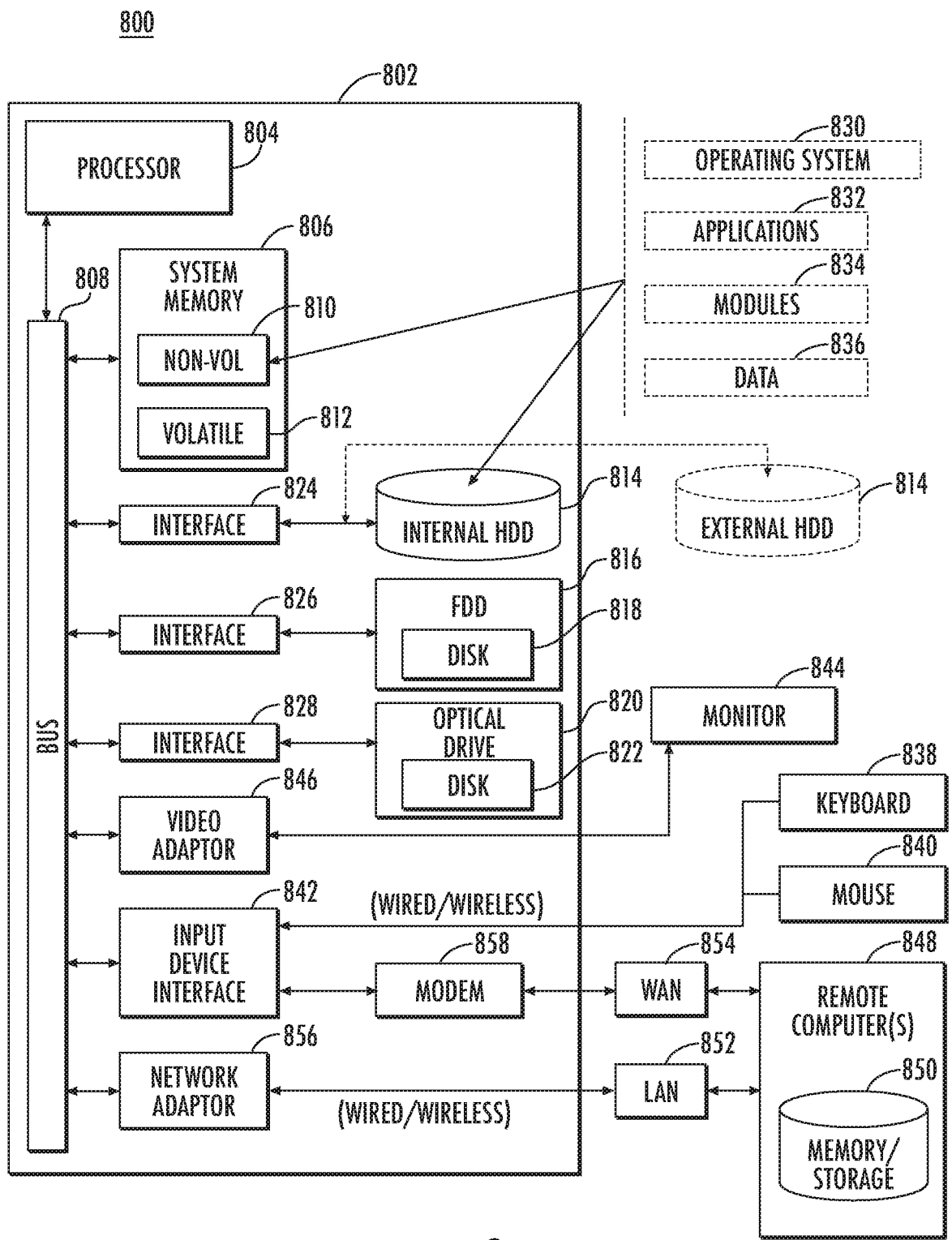
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the system 100. In some embodiments, computing system 802 may be representative, for example, of the mobile devices 110, merchant devices 130, verification systems 120, blockchain 140, of the system 100. The embodiments are not limited in this context. More generally, the computing architecture 800 is configured to implement all logic, applications, systems, methods, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multiprocessor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-5.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the account application 113, verification service 121, blockchain 140, and/or user data 141.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 111 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more embodiments of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
   receiving, by a verification service executing on a server from a mobile device, a digital signature, an encrypted request to provide a user data element to a merchant wallet address, and a user wallet address, wherein an applet of a contactless card generates the digital signature based on a private key of the contactless card, wherein the applet generates the encrypted request based on a first request received from a merchant device as part of a transaction;
   verifying, by the verification service, the digital signature based on a public key associated with the private key of the contactless card;

decrypting, by the verification service, the encrypted request;

receiving, by the verification service, the user data element;

encrypting, by the verification service, the received user data element using the private key to produce an encrypted user data element;

generating, by a node of a blockchain responsive to a second request received from the verification service, a block in the blockchain corresponding to the first request, the block comprising an indication of the verification of the digital signature, the encrypted user data element, the public key, the merchant wallet address as a recipient address of the block, and the user wallet address; and retrieving, by the merchant device, the block, decrypting the encrypted user data element, and authorizing the transaction based on the decrypted user data element.

2. The method of claim 1, wherein the block in the blockchain further comprises an indication of a request token associated with the first request, wherein the user data element is one of a plurality of user data elements, each user data element corresponding to one or more personally identifiable attributes describing a user, the personally identifiable attributes comprising: (i) an age, (ii) a name, (iii) an address, (iv) an identification number, (v) one or more biometric identifiers, (vi) one or more account numbers, and (vii) an email address.

3. The method of claim 1, further comprising: identifying, by the verification service, a plurality of blocks of the blockchain associated with a plurality of prior requests, the plurality of prior requests validated and fulfilled to provide user data elements of a user.

4. The method of claim 1, further comprising: transmitting the second request by the verification service to the node of the blockchain, wherein the second request comprises the encrypted user data element, the indication of the verification of the digital signature, the public key, the merchant wallet address, and the user wallet address.

5. The method of claim 4, further comprising: responsive to generation of the block, reading, by the merchant device, the block in the blockchain; decrypting, by the merchant device based on the public key, the encrypted user data element; and authorizing, by the merchant device, the transaction based on the decrypted user data element.

6. The method of claim 1, wherein the user wallet address is encrypted when received with the request, further comprising:

decrypting, by the verification service based on the public key, the user wallet address to validate an identity of a user.

7. The method of claim 1, wherein verifying the digital signature comprises decrypting the digital signature by the verification service based on the public key, wherein the digital signature comprises a hash value.

8. A system, comprising:
a server executing a verification service, the verification service programmed to:
receive, from a mobile device, a digital signature, an encrypted request to provide a user data element to a merchant wallet address, and a user wallet address, wherein an applet of a contactless card generates the digital signature based on a private key of the contactless card, wherein the applet generates the encrypted request based on a first request received from a merchant device as part of a transaction;

verify the digital signature based on a public key associated with the private key of the contactless card;

decrypt the encrypted request; receive the user data element;

encrypt the received user data element using the private key to produce an encrypted user data element; and transmit a second request to a node of a blockchain;

the node of the blockchain configured to: generate, responsive to the second request received from the verification service, a block in the blockchain corresponding to the first request, the block comprising an indication of the verification of the digital signature, the encrypted user data element, the public key, the merchant wallet address as a recipient address of the block, and the user wallet address; and the merchant device configured to retrieve the block, decrypt the encrypted user data element, and authorize the transaction based on the decrypted user data element.

9. The system of claim 8, wherein the block in the blockchain further comprises an indication of a request token associated with the first request, wherein the user data element is one of a plurality of user data elements, each user data element corresponding to one or more personally identifiable attributes describing a user, the personally identifiable attributes comprising: (i) an age, (ii) a name, (iii) an address, (iv) an identification number, (v) one or more biometric identifiers, (vi) one or more account numbers, and (vii) an email address.

10. The system of claim 8, wherein the second request comprises the encrypted user data element, the indication of the verification of the digital signature, the public key, the merchant wallet address, and the user wallet address.

11. The system of claim 8, further comprising the merchant device, the merchant device programmed to: responsive to generation of the block, read the block in the blockchain; decrypt, based on the public key, the encrypted user data element; and authorize the transaction based on the decrypted user data element.

12. The system of claim 8, the verification service programmed to: identify a plurality of blocks of the blockchain associated with a plurality of prior requests, the plurality of prior requests validated and fulfilled to provide user data elements of a user.

13. The system of claim 8, wherein the user wallet address is encrypted when received with the request, wherein the verification service is programmed to: decrypt, based on the public key, the user wallet address to validate an identity of a user.

14. A non-transitory computer-readable storage medium storing computer-readable program code executable by a plurality of processors causes the plurality of processors to:

receive, by a verification service from a mobile device, a digital signature, an encrypted request to provide a user data element to a merchant wallet address, and a user wallet address, wherein an applet of a contactless card generates the digital signature based on a private key of the contactless card, wherein the applet generates the encrypted request based on a first request received from a merchant device as part of a transaction;

verify, by the verification service, the digital signature based on a public key associated with the private key of the contactless card;

decrypt, by the verification service, the encrypted request; receive the user data element;

encrypt, by the verification service, the received user data element using the private key to produce an encrypted user data element; and generate, by a node of a blockchain, a block in the blockchain corresponding to the first request, the block comprising an indication of the verification of the digital signature, the encrypted user data element, the public key, the merchant wallet address as a recipient address of the block, and the user wallet address; and retrieve, by the merchant device, the block, decrypt the encrypted user data element, and authorize the transaction based on the decrypted user data element.

15. The non-transitory computer-readable storage medium of claim 14, wherein the block in the blockchain is generated responsive to a second request, wherein the second request comprises the encrypted user data element, the indication of the verification of the digital signature, the public key, the merchant wallet address, and the user wallet address.

16. The non-transitory computer-readable storage medium of claim 14, wherein the block in the blockchain further comprises an indication of a request token associated with the first request, wherein the user data element is one of a plurality of user data elements, each user data element corresponding to one or more personally identifiable attributes describing a user, the personally identifiable attributes comprising: (i) an age, (ii) a name, (iii) an address, (iv) an identification number, (v) one or more biometric identifiers, (vi) one or more account numbers, and (vii) an email address.

17. The non-transitory computer-readable storage medium of claim 14, storing computer-readable program code executable by the processor to cause the processor to: receive, from the merchant device, an indication that the transaction was authorized.

18. The non-transitory computer-readable storage medium of claim 14, storing computer-readable program code executable by the processor to cause the processor to: decrypt the digital signature based on the public key to verify the digital signature, wherein the digital signature comprises a hash value.

19. The non-transitory computer-readable storage medium of claim 14, wherein the user wallet address is encrypted when received with the request, the medium storing computer-readable program code executable by the processor to cause the processor to: decrypt, based on the public key, the user wallet address to validate an identity of a user.

20. The non-transitory computer-readable storage medium of claim 14, wherein the code to verify the digital signature comprises code to decrypt the digital signature based on the public key, wherein the digital signature comprises a hash value.

* * * * *